Oct. 8, 1929.  J. J. GILBERT  1,730,971

TREATING LOADED SUBMARINE CABLES

Filed Sept. 10, 1927

INVENTOR
JOHN J. GILBERT
BY J. W. Schmied
ATTORNEY

Patented Oct. 8, 1929

1,730,971

UNITED STATES PATENT OFFICE

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK

TREATING LOADED SUBMARINE CABLES

Application filed September 10, 1927. Serial No. 218,841.

The present invention relates to means for improving the electrical properties of loaded submarine signaling conductors.

The continuously loaded conductor used in submarine signaling cables consists of a central copper wire surrounded by tape or wire of magnetic material forming a thin layer, through which runs a helical air-gap. Owing to the presence of this air-gap the magnetic flux due to current in the central conductor may be resolved into two components, parallel and perpendicular, respectively, to the air-gap. The inductance of the conductor is determined under ordinary conditions largely by the value of the first of these components. A magnetic field of any kind or value impressed on the loading material gives rise to a flux which, in general, may also be resolved into components parallel and perpendicular to the air-gap. A given magnetic material responds in various degrees to a given magnetic field, depending upon the history of the material or upon the presence of other fields. It is possible, therefore, to affect the inductance of a loaded submarine cable by means of a magnetic field superimposed upon the loading material.

Another peculiarity of continuously loaded submarine cables becomes manifest in their operation. It has been found that when continuously loaded cables are operated duplex, a lack of symmetry exists between the unbalances resulting from positive and negative closures of the key. This lack of symmetry is chiefly due to the dissimilitude and unequal variations of the loading material characteristics of the cable with respect to those of the artificial line, as well as to the effect of the earth's magnetic field upon the loading material of the cable.

A characteristic of loaded conductors of importance in submarine signaling is the increase of inductance and effective resistance with signaling current. Due to this phenomenon there are two undesirable effects present in loaded signaling cables. First, modulation occurs between parts of the same signal or between two different superposed signals, resulting in distortion of the signals. Second, the effective resistance in the portion of the cable adjacent to the transmitting terminal is so large, that the attenuation constant may be greatly increased above its value corresponding to small currents, and consequently the efficiency of transmission of the cable is decreased.

In applicant's copending application, Serial No. 696,981, filed March 5, 1924, there is described a method of reducing the attenuation and distortion in a loaded signaling conductor by means of loading the cable more heavily in the central portions and more lightly at or near the terminals. In other words, in accordance with that method the inductance of the cable is increased in the center portions and progressively reduced toward the end portions of the cable.

It has been proposed to subject loaded submarine cables during or after their manufacture to the demagnetizing action of alternating currents for the purpose of rendering the properties of these cables more uniform. See, for example British Patents 224,827 and 235,570. However, the objects of the present invention are not attained by demagnetizing a cable by means of an alternating current alone. One reason, for example, why this is the case is that any gain in inductance secured is likely to be neutralized by the subsequent handling of the cable.

Among the objects of this invention are to reduce the effective resistance and to increase the ratio of effective inductance to effective resistance of a loaded submarine cable; to reduce the variation of inductance with magnetizing current or magnetizing force; to reduce the distortion of signal waves; to facilitate duplex balancing; and to render the properties of a loaded cable conductor more uniform.

Means and methods are provided for carrying the above objects into effect during or after the laying of the whole, or a portion, of a loaded submarine cable.

These and other objects and advantages, which will be set forth hereinafter, are attained, in one aspect of the invention, by subjecting the loading material of the cable to the simultaneous influence of a properly selected unidirectional magnetic field, and a superposed alternating field, the alternating field being gradually diminished from a value sufficient to influence the loading material to zero.

The distinctive features of the present invention are set forth with particularity in the appended claims. Several examples of methods of and means for carrying the invention into effect will now be explained in detail, in the following description, with reference to the accompanying drawings, in which:—

Figure 1:
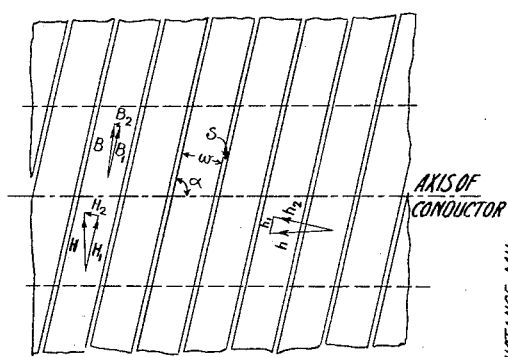
Fig. 1 is an enlarged developed view of the loading tape of a continuously loaded submarine signaling cable on a short length of conductor.

It has been observed that the effective inductance of a loaded submarine cable conductor as a whole, or of individual portions thereof, is not invariable with current or applied magnetizing forces, but in fact, tends to vary as the applied magnetizing force varies. The desirability of making the inductance more uniform in consecutive portions of the cable and of reducing the variation of inductance with magnetizing force underlies the present invention. The invention is based in part upon the observation that treatment of a loaded submarine cable conductor by applying a unidirectional magnetizing force of appropriate value to the loading material, and superimposing upon this an alternating magnetizing force, which alternating magnetizing force is gradually reduced to zero, tends to reduce the variation of inductance with magnetizing force. An additional result of the same treatment is that the ratio of inductance to resistance is increased.

Suitable methods of applying superimposed unidirectional and alternating magnetizing forces are described hereinafter. These methods vary with respect to whether the cable is long or short, laid or not yet laid, and other circumstances. There is some evidence that magnetic materials may have magnetic properties differing in one direction through their mass, and in another, and that these properties may vary in accordance with the previous history of the material. When a signaling current is sent through a loaded conductor having loading material wrapped helically thereabout, the permeability of the material in a direction following the helix is that which is important in establishing the properties of the conductor.

Any elongated conductor, unless it be placed perpendicular to the earth's field, will have a component of the earth's field effective in a longitudinal direction. In some cases, especially with high permeability materials, this component must be taken into account in applying a unidirectional magnetizing force to a conductor. A direct current flowing through the conductor may set up a magnetization effective to aid or oppose the magnetism due to the earth's field. For this and other reasons, it seems desirable to analyze the relation of the magnetic effect in loading material due to a current flowing therethrough, with respect to the magnetic effect therein, due to external fields such as the earth's field. As a preliminary matter, therefore, this relation will now be discussed.

For convenience the turns of the helically applied loading strip may be considered as parallel strips. See Fig. 1. The magnetizing force $H$ due to a current $I$ in the conductor is equal to $$\frac{0.4I}{d},$$

where $d$ is the diameter of the central conductor. The magnetizing force $H$ can be resolved into two components $$H_1 = H \cos \alpha$$
$$H_2 = H \sin \alpha,$$

parallel and perpendicular, respectively, to the edge of the tape. The effective permeability in these two directions being $\mu_1$ and $\mu_2$, respectively, the resulting flux densities are $$B_1 = \mu_1 H_1$$

and $$B_2 = \mu_2 H_2$$

The effective permeability in the direction parallel to the tape $\mu_1$ is the actual permeability $\mu$ of the loading material, whereas the effective permeability perpendicular to the tape is given by the expression $$\frac{\mu(w+s)}{(w+\mu s)},$$

($w$ being the width of the loading tape), and is usually not greater than 0.1 $\mu$.

From Fig. 1 it can be seen that when a magnetizing force $h$ parallel to the axis of the conductor (due, for example, to a field in which the conductor lies) is impressed upon the loading material, its effect can be determined by resolving it into a component parallel to the direction of the tape $$h_1 = h \sin \alpha,$$

and a component perpendicular to the tape $$h_2 = h \cos \alpha.$$

If $H$ and $h$ are impressed simultaneously the magnetizing force along the tape will be $$H \cos \alpha - h \sin \alpha,$$

and the magnetizing force perpendicular to the tape will be $$H \cos \alpha + H \sin \alpha.$$

The variations of inductance and of effective resistance due to electric and magnetic losses in the loading material are principally determined by the time rate of variation of the flux which results from the component of magnetizing force parallel to the direction of the tape. Assuming that H represents the field due to the signaling current, then since the flux density in the direction of the tape is equal to $$\mu_1 (H \cos \alpha - h \sin \alpha),$$

it is evident that even though the superposed magnetizing force $h$ is constant with respect to time, it will influence the flux density, and consequently the inductance and resistance of the conductor, because of the fact that the values of $\mu_1$ and of its time rate of variation depend upon the total magnetizing force.

From the above formulæ we may draw the conclusion that the resultant component of magnetizing force in the direction of the loading tape of a signaling conductor may be varied by means of a current in the conductor. Let us assume, for example, that it is desired to neutralize a magnetizing force in the direction of the loading tape, due to the presence of a component of the earth's field parallel to the conductor and of magnitude $h$. This can be accomplished in accordance with the present invention by means of a direct current in the conductor having a magnetizing force of such value that $$H \cos \alpha - h \sin \alpha = 0,$$

or $$H = h \tan \alpha.$$

The direct current thus required for this neutralization can easily be derived from the relation $$H = \frac{0.4 I}{d}. \quad (1)$$

It has to be borne in mind, however, that the application of the current must take place in the proper direction with respect to the direction of the earth's field, so as to oppose it, or to reinforce it, as the case may be.

Figure 2:
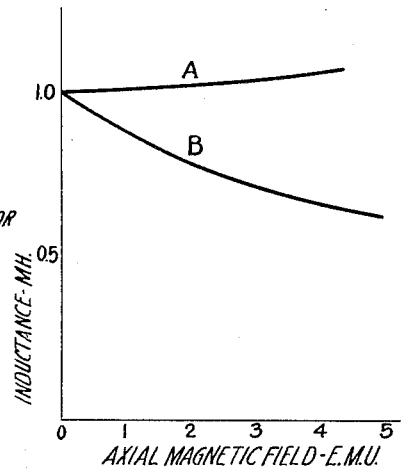
Fig. 2 is a graph of the comparative results of inductance measurements of a continuously loaded conductor when subjected to zero and considerable extraneous superposed axial magnetic fields, respectively.

Fig. 2 represents the dependence of the inductance of a loaded signaling conductor upon the magnitude of the extraneous superposed magnetic field. A current of constant frequency and of amplitude gradually diminishing to zero (the initial amplitude being about 0.5 amperes) was sent through the conductor. For the purposes of explanation, this treatment of the conductor shall herein be referred to as "stabilization". Curve A of Fig. 2 represents the inductance measurements made after the magnetic material had been stabilized in the presence of a superposed unidirectional magnetic field of zero intensity, no further stabilization occurring during the course of these measurements. Curve B, on the other hand, represents the inductance measurements during which the superposed unidirectional magnetic field was first set at a given value, the conductor being then stabilized in this field and the inductance measured. As it will be seen from the curves, the inductance of the conductor is increased by the mere presence of the superposed field, whereas the inductance is decreased by stabilization of the magnetic material in the superposed field.

Figure 3:
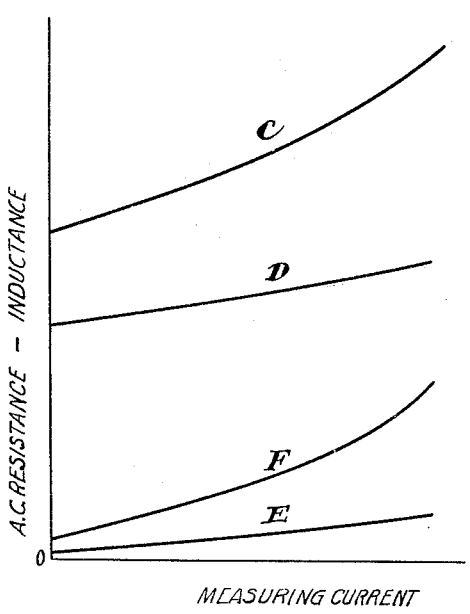
Fig. 3 depicts the comparative results of measurements of the inductance and the resistance of treated and untreated continuously loaded submarine sample conductors at various values of measuring current.

Fig. 3 shows the results of measurements of the inductance and the resistance increment (difference between the effective and direct current resistances) of a loaded conductor at various values of the measuring current.

A copper conductor of 21 feet (640 centimeters) length and .13 inches (.33 centimeters) diameter, loaded with .0088 inch x .063 inch (.223 mm. x 1.6 mm. permalloy tape was first subjected to direct current fields of $H=0$ gauss and $H=.3$ gauss. Simultaneously an alternating current of 60 c. p. s. was superposed and the alternating current was reduced to 0 from values ranging between 0.5 ampere to 0.1 ampere. After this treatment the inductance and resistance of the sample were determined at various values of a measuring current of 75 c. p. s. The graphical illustration of the results of these tests clearly sets forth the advantages to be gained by employing a superposed field of a certain intensity for the purpose of diminishing the variation of resistance and inductance in loaded submarine cables. Curves D and E, respectively, represent the results of measurements at various current values of the inductance and resistance of the conductor stabilized in a direct current field of .3 gauss. Curves C and F, respectively, show the results of inductance and resistance measurements of the same conductor when stabilized in zero field. Summarizing the results of these tests and considering first curves C and D, the percentage increase in the case of the tests represented by curve D is about half the percentage increase represented by curve C, in going from 0 current to maximum current. As to the resistance increase of curves E and F, the resistance represented by curve F is increased eleven times, whereas the resistance has been increased only five times in case of curve E.

Although the results shown by these curves were obtained for the special case of a magnetic field parallel to the axis of the conductor, they are of more general application, since any uniform magnetic field intersecting the conductor from any direction can be resolved, at every point in the loading material, into three components having directions parallel and perpendicular to the axis and tangential to the surface of the conductor, respectively. Considering each of these components in successive short lengths contained in a complete convolution of loading tape, it is seen that the component parallel to the axis is the only one that does not suffer frequent change of magnitude and direction due to magnetic poles set up in the loading material. It will be appreciated, therefore, that the results shown in the curves represent the effect produced by any ordinary field, the axial component of which has the values indicated.

It has been shown that the inductance and the rate of variation of inductance with current can be controlled by stabilizing the conductor in the presence of a superposed magnetic field of suitable value. For any given cable the most desirable set of values of these two characteristics depends upon the conditions under which the cable is to be operated. Since, in general, there will be a component of the earth's field in the direction of the cable conductor, it will be necessary, in order to obtain the desired unidirectional field in the loading material, to superpose on the component of the earth's field in the direction of the tape another field by means of a steady current in the conductor.

The present invention may be applied to cables already laid, as well as to cables being laid. In its application to cables already laid we may distinguish its employment in connection with short and long cables.

In the case of signaling cables having lengths not greater than a few hundred miles, the superposed current may be maintained during operation of the cable by means of a direct current source placed at one or both terminals. Such sources might be in series with transmitting and/or receiving apparatus connected to the cable, but might be placed in series with large choke coils placed in shunt to transmitting and/or receiving apparatus.

Figure 5:
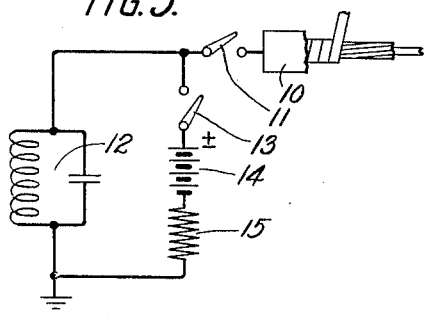

In the case of longer cables, such as are used in submarine telegraphy, for example, the superposed current voltage required is often so large, of itself or combined with the voltage used for signaling, that the potential between the cable and the ground would become prohibitive, since it would damage the cable insulation. In this case a potential may be suddenly impressed at one or both ends of the cable. The transient current at points near the ends of the cable due to voltage surges applied to one or both of the terminals may be considerably larger than the steady direct current due to the same value of applied potential. Fig. 5 illustrates one possible arrangement for practicing the invention in such a case. The cable 10 is connected over key 11 and tuned circuit 12 to the ground. In shunt to this circuit is provided another circuit including key 13, a battery 14 and a resistance 15. In order to treat cable 10, key 11 is closed first, then key 13 is closed. After an instant of time key 11 is opened. The closing of key 13 impresses a direct current surge on the cable, and also sets up a damped oscillation in the tuned circuit which causes a damped alternating current to flow into the cable. The opening of key 11, as soon as the alternating current has fallen to a small value, cuts off the direct current voltage to the cable. This operation may be repeated at suitable intervals, in order to keep the terminal sections, or the whole cable, in the desired condition.

One mode of practicing the present invention during the laying operation of the submarine cable will now be described.

Figure 4:
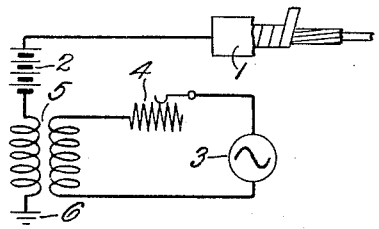
Figs. 4 and 5 illustrate various modes of applying the present invention to loaded submarine signaling cables.

In Fig. 4, a section of cable 1 is illustrated in progress of being laid, or in case of a short cable, 1 may represent the entire length of the cable. As it is common practice to manufacture cables in sections of about 400 miles and then to splice these sections together during the process of laying, we shall mention 400 miles as the approximate length of cable section 1. Assume, for instance, that it is desired to treat cable section 1 of Fig. 4. In accordance with one method of practicing this invention there are provided, on board of the cable laying ship, means for simultaneously impressing unidirectional and alternating fields upon the section, including direct current source 2, alternating current source 3, adjustable resistance 4 and transformer 5. As soon as the laying operation of the section has been completed, a direct current field from source 2 of about .3 gauss is impressed upon the cable section simultaneously with an alternating current derived from source 3. For example, an alternating current of the general order of from .1 to .5 amperes and 60 cycles may be employed. However, a different current intensity may be used if necessary, the criterion being that the loading material of the cable has to be stabilized. As to the intensity of the direct current in any particular case, this may be easily derived from the relation (1) given above. Furthermore, the direction of the direct current field applied must be such as to either oppose or reinforce the direction of the earth's field, as has been explained above. By means of adjustable resistance 4 the alternating current field may be gradually diminished and reduced to zero. The cable section which has been thus treated may then be disconnected and spliced to another section, if any. The following section or sections are then treated in a similar manner, except that the alternating current intensity may be so chosen as to taper its effect upon subsequent cable sections. The figure, 400 miles of cable length, is merely given because this is a commonly used length of cable made before splicing, and it is obvious that sections of lengths differing from this figure may be treated. It is also evident that in using different values of direct current, the degree to which the inductance is reduced, may be changed at different points of the cable, in order to gradually reduce the inductance of the cable toward the terminal section, thus giving a tapered effect. Furthermore, the treatment, if any, of the subsequent cable sections may differ in this from the treatment of the first or central sections, that alternating current of higher frequency, for example 120 cycles, may be employed. By so choosing the alternating current as to attenuate its intensity toward the cable end farthest removed from the point of applicaion, the effect of its use upon the first section or sections may be made small or negligible.

Furthermore, since for well known reasons variations of inductance with current near the ends of a long table are much more important than in the middle portions, it may be sufficient in practice to treat one or two terminal sections only. Since cables may be laid from both ends and joined in any intermediate point, treatment of the first one or more end sections at each end will be practicable.

Another method of obtaining a unidirectional magnetic field of given value is to lay out the route of the cable so that the portion which it is desired to influence is inclined at a suitable angle to the earth's magnetic field. If then the loading material is stabilized by means of a superposed alternating current which may be applied either during or after the laying operation, the cable will be brought into the desired electric condition. The stabilizing treatment may be repeated at suitable intervals, if necessary.

It is known that certain difficulties in accurate balancing of loaded submarine cables are due to variations of inductance with current. This is especially true of such variations in the head end of the cable. To the extent that the present invention enables the variation of inductance with current to be reduced, the particular difficulties due to this cause are remedied by corresponding reduction in magnitude of the unbalance effects.

In U. S. Patent #1,607,473, November 16, 1926, to J. W. Milnor, there is described a system for electrically balancing long loaded submarine cables for duplex signaling. In accordance with the present invention the treatments herein described may be applied to artificial lines such as that described in Patent 1,607,473, as well as to any other line containing inductance coils, with an effect analogous to that accomplished in the loaded signaling lines themselves.

The novel features believed to be inherent in the invention are defined in the appended claims.

What is claimed is:

1. The method of modifying the inductance, and/or reducing the variation of inductance with current, and/or increasing the inductance-resistance ratio of all, or one, or more parts of a loaded submarine cable system, which consists in subjecting the completed cable or part, or parts, to the simultaneous influence of a natural or artificially produced uni-directional field and a superposed alternating field, the alternating field being gradually diminished from a value sufficient to stabilize the loading material of said cable to zero.

2. The method of improving the inductance-current and resistance-current characteristics of a continuously loaded submarine signaling cable, which consists in simultaneously applying to said cable a unidirectional magnetic field, and an alternating field of at least the approximate intensity required to stabilize the loading material of said cable, and gradually reducing said alternating field to zero.

3. The method of improving the transmission characteristics of submarine conductors continuously loaded with a strain sensitive magnetic material, which comprises subjecting said cable to the simultaneous influence of alternating and uni-directional fields, said alternating field being progressively diminished from a large value to a relatively small value while the uni-directional field is maintained.

4. The method of treating a terminal portion of a loaded signaling cable, which consists in simultaneously applying to said cable uni-directional surges of current of large amplitude, and an alternating current, and gradually reducing the alternating current to zero during each surge.

5. The method which comprises laying a portion of loaded submarine cable at such an angle with respect to the direction of the earth's magnetic field, that the component of said magnetic field which is effective in said loading material produces a desired uni-directional magnetic field superposed upon said portion, and producing upon occasion an alternating current of considerable value in said portion, and reducing said current gradually to zero.

6. The method of treating the magnetic material of the inductance element in a duplex submarine cable signaling system including a balancing network, which comprises impressing upon at least a portion of the magnetic material employed in the system a uni-directional magnetic field and a superposed alternating magnetic field, and gradually reducing said alternating field to zero.

7. The method which comprises laying a section of a loaded submarine cable and, before splicing thereto the next section, treating the laid section by impressing superimposed alternating and direct currents thereon, to improve the electrical characteristics thereof.

8. A method which comprises treating a laid section of a long loaded submarine cable with superposed alternating and direct currents to improve the electrical characteristics thereof, and employing for such purpose alternating currents of such frequency as will be attenuated to such an extent before reaching adjacent sections as to have relatively little effect thereon.

9. The method of treating a continuously loaded signaling cable during the operation thereof which method comprises subjecting the loading material to the simultaneous influence of a unidirectional and an alternating magnetizing field and gradually diminishing the alternating field to zero.

In witness whereof, I hereunto subscribe my name this 8 day of September A. D., 1927.

JOHN J. GILBERT.